(12) United States Patent
Ronda et al.

(10) Patent No.: US 8,668,844 B2
(45) Date of Patent: Mar. 11, 2014

(54) FLUORESCENT MATERIAL FOR USE IN CT APPLICATIONS

(75) Inventors: Cornelis Reinder Ronda, Aachen (DE); Guenter Zeitler, Aachen (DE); Herbert Schreinemacher, Baesweiler (DE); Norbert Conrads, Raeren (BE); Detlef Uwe Wiechert, Alsdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 280 days.

(21) Appl. No.: 13/054,866

(22) PCT Filed: Jul. 13, 2009

(86) PCT No.: PCT/IB2009/053025
§ 371 (c)(1),
(2), (4) Date: Jan. 19, 2011

(87) PCT Pub. No.: WO2010/010480
PCT Pub. Date: Jan. 28, 2010

(65) Prior Publication Data
US 2011/0114887 A1    May 19, 2011

(30) Foreign Application Priority Data
Jul. 23, 2008 (CN) .......................... 2008 1 0142960

(51) Int. Cl.
*G21K 4/00* (2006.01)

(52) U.S. Cl.
USPC .......... 252/301.4 R; 250/363.02; 250/370.11; 378/6; 378/62; 378/65

(58) Field of Classification Search
USPC ................ 252/301.4 S, 301.4 R; 250/363.02, 250/370.11; 378/6, 62, 65
See application file for complete search history.

(56) References Cited

U.S. PATENT DOCUMENTS

| | | | |
|---|---|---|---|
| 3,833,862 A | | 9/1974 | Wickersheim et al. |
| 3,856,698 A | * | 12/1974 | Nath ........................ 252/301.4 S |
| 3,891,852 A | * | 6/1975 | Bollen et al. .................. 250/391 |
| 5,216,252 A | | 6/1993 | Boone et al. |
| 5,451,793 A | | 9/1995 | Boone |
| 5,558,815 A | | 9/1996 | Yokota |
| 5,640,016 A | | 6/1997 | Matsuda et al. |
| 6,940,216 B2 | * | 9/2005 | Juestel et al. ................. 313/486 |
| 2003/0075706 A1 | | 4/2003 | Shiang et al. |

FOREIGN PATENT DOCUMENTS

| | | | |
|---|---|---|---|
| CN | 1587201 A | | 3/2005 |
| CN | 1837142 | * | 9/2006 |
| DE | 10335166 | * | 3/2012 |
| EP | 0139192 A2 | | 5/1985 |
| EP | 235387 | * | 9/1987 |
| EP | 0235387 A2 | | 9/1987 |
| EP | 825161 | * | 2/1998 |
| EP | 0825161 A1 | | 2/1998 |
| EP | 1223464 | * | 7/2002 |
| EP | 1223464 A2 | | 7/2002 |
| JP | 2006-016251 | * | 1/2006 |
| JP | 2007513038 A | | 5/2007 |
| WO | 2008020373 A2 | | 2/2008 |
| WO | WO 2005/104162 | * | 11/2012 |

OTHER PUBLICATIONS

Chemical Abstract citation 1975:9787, Stimulated radiation of lutetium gallium oxide (Lu3Ga5O12) crystals with neodymium (3+) ions in the 4F3/2.far.4I11/2 and 4F3/2 .far. 4I13/2 transitions:, Bagdasarov et al, Doklady Akademii Nauk SSSR, 218(2), 1974, pp. 316-319.*
Abstract for CN 1837142, Sep. 27, 2006.*
Translation for JP 2006-16251, Jan. 19, 2006.*
Danevich et al: "YAG:Nd Crystals as Possible Detector to Search for 2β and α Decay of Neodymium"; Nuclear Instruments and Methods in Physical Research A 541 (2005), pp. 583-589.
Niklas et al: "X-Ray Luminescence of YAG:Nd3+"; Phys. Stat. Sol., 77, p. 393-398, 1983.
Orlovskii et al: "Oxysulfide Optical Ceramics Doped by Nd3+ for One Micron Lasing"; Journal of Luminescence, 125, pp. 201-215, 2007.
Song et al: "Study on YAG:Nd3+ Spectra. II. Flourescence Spectra"; Journal of Chem. Phys. 89(9), Nov. 1988, pp. 5404-5407.

* cited by examiner

*Primary Examiner* — Carol M Koslow

(57) ABSTRACT

The invention relates to a $Gd_2O_2S$:Nd fluorescent material and the use of $Nd^{3+}$ as emitter in suitable materials.

7 Claims, 1 Drawing Sheet

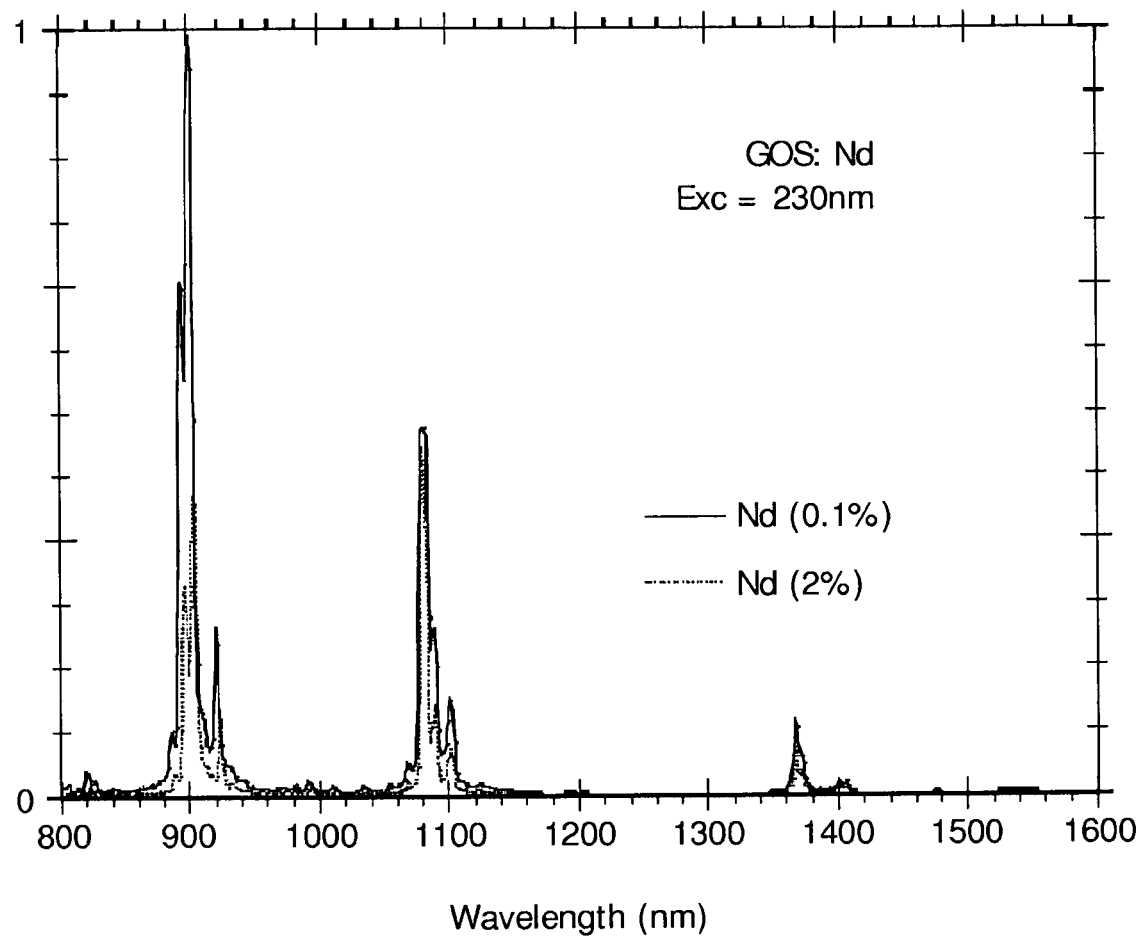

FLUORESCENT MATERIAL FOR USE IN CT APPLICATIONS

FIELD OF THE INVENTION

The present invention is directed to a fluorescent gadolinium-containing powder, especially for use in CT and/or X-ray applications.

The invention further relates to a method of manufacturing a fluorescent ceramic using single-axis hot pressing.

The invention still further relates to a detector for detecting ionizing radiation.

The invention still further relates to a use of said detector for detecting ionizing radiation.

BACKGROUND OF THE INVENTION

Fluorescent members for detecting high-energy radiation contain a phosphor that can absorb the radiation and convert it into visible light. The luminescent emission thereby generated is electronically acquired and evaluated with the assistance of light sensitive systems such as photodiodes or photomultipliers. Such fluorescent members can be manufactured of single-crystal materials, for example, doped alkali halides. Non-single-crystal materials can be employed as powdered phosphor or in the form of ceramic members manufactured therefrom.

A typical fluorescent ceramic material employed for detecting high-energy radiation is Pr-doped $Gd_2O_2S$. Another material is Eu-doped $(Y,Gd)_2O_3$.

Although the materials used in the present state of the art have their advantages, there is still a constant need for further alternative materials which are useful as fluorescent materials in CT and/or X-ray applications.

SUMMARY OF THE INVENTION

A first object of the present invention is to provide a scintillating material for use in CT and/or X-ray applications.

This object is achieved by a fluorescent material of the present invention. Accordingly, a $Gd_2O_2S$:Nd fluorescent material is provided.

This object is furthermore achieved by the use of Nd as emitter in one or more of the following materials: $Gd_2O_2S$, $(Y,Gd)_2O_3$, $Lu_3Al_5O_{12}$, $Y_3Al_5O_{12}$, $Lu_3Ga_5O_{12}$.

The term "emitter" in the sense of the present invention especially means and/or includes that Nd is capable of emitting light in the wavelength range of 400 to 1200 nm upon the incidence of X-ray radiation.

The inventors have found that, surprisingly, the incorporation of Nd in $Gd_2O_2S$ and/or $(Y,Gd)_2O_3$, $Lu_3Al_5O_{12}$, $Y_3Al_5O_{12}$, $Lu_3Ga_5O_{12}$ materials leads to a fluorescent material with good emitting characteristics. Especially one advantage is that in most applications of the present invention there is no or hardly any "afterglow".

It should be noted that the materials of the present invention may be contaminated by other rare-earth ions. Typical examples are Pr, Dy, Sm, Ce, Eu, Yb. The concentrations of these ions should preferably be kept very low, preferably less than 0.5 mole ppm.

According to a preferred embodiment of the present invention, the $Gd_2O_2S$:Nd fluorescent material and/or the host material of the material where Nd is used as emitter is provided as a ceramic material.

The term "ceramic material" in the sense of the present invention means and/or includes especially a crystalline or polycrystalline compact material or composite material which has a controlled amount of pores or which is pore-free.

The term "polycrystalline material" in the sense of the present invention means and/or includes especially a material with a volume density larger than 90 percent of the main constituent, consisting for more than 80 percent of single-crystal domains, with each domain being larger than 0.5 µm in diameter, and may have different crystallographic orientations. The single-crystal domains may be interconnected by amorphous or glassy material or by additional crystalline constituents.

The introduction of Nd ions can be carried out using aqueous solutions of corresponding salts: $NdCl_3$, $NdBr_3$, $NdI_3$, $Nd(NO_3)_3$, $Nd_2(SO_4)_3$ etc. Alternatively, the introduction of dopant ions can be carried out during preparing a mechanical mixture of gadolinium-containing powders, such as $Gd_2O_2S$, with insoluble compositions comprising the dopant, like oxides, for example $Nd_2O_3$.

Further alternatively, gadolinium-containing powders, such as $Gd_2O_2S$ powder, may be mechanically mixed with water-insoluble salts of Nd, like $NdF_3$, $Nd_2S_3$, $Nd_2O_2S$, $Nd_2(CO_3)_3$, $Nd_2(C_2O_4)_3$ and the like.

According to a preferred embodiment of the present invention, the doped pigment powder of $Gd_2O_2S$ has a surface according to BET in the range of $\geq 0.01$ $m^2/g$ and $\leq 1$ $m^2/g$, preferably $\geq 0.05$ $m^2/g$ and $\leq 0.5$ $m^2/g$ and more preferably $\geq 0.1$ $m^2/g$ and $\geq 0.2$ $m^2/g$.

According to a preferred embodiment of the present invention, the $Nd^{3+}$ concentration in the host material is between $\geq 10$ and $\leq 2000$ wt. ppm, preferably $\geq 100$ to $\leq 1000$ wt. ppm and most preferably $\geq 500$ to $\leq 1000$ wt. ppm. These margins have shown in practice to be suitable in the present invention.

According to a preferred embodiment of the present invention, a $Gd_2O_2S$:Nd fluorescent ceramic material according to the present invention exhibits a relative light yield of >120%, and preferably more than 230%, of the light output of $CdWO_4$.

Light output and afterglow were measured with a Hamamatsu Photodiode and a National Instruments ADC. The afterglow was measured at 120 kV/100 mA, using a 80 cm FDD (18-20 mGy/s), and 2 s pulse. The signal values (light output) were measured on 4×4 $mm^2$ pixels, silicone-glued to a photodiode. The afterglow is measured after the X-ray pulse has been switched off.

According to a preferred embodiment of the present invention, the $Gd_2O_2S$:Nd fluorescent material is transparent. It should be noted that the $Gd_2O_2S$:Nd fluorescent material can be yellow colored in case Ce is present.

According to a preferred embodiment of the present invention, the transmission of the $Gd_2O_2S$:Nd fluorescent material at the wavelength of spontaneous emission in the spectral region of 880-1200 nm is 10% to 70%, preferably 20% to 60% and more preferably $\geq 40$% and most preferably $\leq 50$%, with respect to a layer thickness of 1.6 mm. The measurements of total transmission were carried out using a Perkin Elmer spectrometer.

A further object of the present invention is directed to a gadolinium-containing pigment powder which is useful in the manufacture of a $Gd_2O_2S$:Nd fluorescent material according to the present invention.

The inventors have surprisingly found that a $Gd_2O_2S$:Nd fluorescent material with reduced afterglow can be obtained if a gadolinium-containing pigment powder is used which contains Nd as described above.

Preferably, the gadolinium-containing pigment powder can be selected from the group comprising $Gd_2O_3$, $Gd_2O_2S$ and/or $Gd_2O_2S$:Nd A further object of the present invention is directed to a method for the manufacture of a fluorescent ceramic material according to one embodiment of the present invention, using hot-pressing, said method comprising the following steps:

a) selecting a pigment powder of $Gd_2O_2S$:Nd as described above, the grain size of said powder used for hot-pressing ranging from 1 µm to 20 µm, and said hot-pressing being carried out at
a temperature of 1000° C. to 1400° C.; and/or
a pressure of 100 MPa to 300 MPa;

b) air annealing at a temperature of 700° C. to 1200° C. for a time period of 0.5 hours to 30 hours, and optionally between step a) and step b) an additional step c) is carried out, step c) comprising annealing fluorescent ceramic material under vacuum at a temperature of 1000° C. to 1400° C. for a period of time of 0.5 hours to 30 hours.

It has been found that relatively coarse-grained powders which are chemically stable in air can be successfully pressed to form a fluorescent crystal with improved characteristics.

Thus, according to the present invention it may be preferred that the pressing process takes place at
a temperature of 1000° C. to 1400° C., preferably 1100° C. to 1300° C., more preferably 1150° C. to 1250° C.; and/or
a pressure of 100 MPa to 300 MPa, preferably 180 MPa to 280 MPa and more preferably 200 MPa to 250 MPa. Preferably, the vacuum during the step of uni-axial pressing according to the present invention is ≤100 Pa and ≥0.01 Pa.

According to the present invention, the vacuum can be adjusted so as to be in the range of ≥0.01 Pa and ≤50 Pa, preferably in the range of ≥0.01 Pa and ≤10 Pa and most preferably the vacuum is adjusted so as to be in the range of ≥0.01 Pa and ≤1 Pa.

The fluorescent ceramic, after the step of hot-pressing under vacuum, can be further treated by air annealing at a temperature of 700° C. to 1200° C., preferably 800° C. to 1100° C., more preferably 900° C. to 1000° C., the time period for the air annealing treatment ranging from 0.5 hours to 30 hours, preferably 1 hour to 20 hours, more preferably 2 hours to 10 hours and most preferably 2 hours to 4 hours.

In an embodiment it is preferred that $Gd_2O_2S$ pigment powder used according to the present invention has an average grain size in the range of 1 µm to 20 µm, more preferably 2 µm to 10 µm and most preferably 4 µm to 6 µm.

According to the present invention it is advantageous to introduce the vacuum annealing step for still further improving the optical properties of the resulting ceramics. During this step, a further grain growth in the ceramics takes place, which further improves transparency due to a decrease in porosity. In addition, due to the grain growth, additional diffusion of dopant atoms in the lattice of oxysulfide enables still further improving the scintillating properties of the ceramics.

Therefore, according to one embodiment of the method according to the present invention, between step a) and step b) an additional step c) can be carried out, wherein step c) comprises annealing fluorescent ceramic under vacuum at a temperature of 1000° C. to 1400° C. for a period of time of 0.5 hours to 30 hours.

Preferably, the annealing temperature is selected in the range of 1100° C. to 1300° C., more preferably 1200° C. to 1250° C.

The time period for vacuum annealing can be preferably set so as to range from 1 hour to 20 hours, more preferably 2 hours to 10 hours and most preferably 3 hours to 5 hours.

The present invention further relates to a detector arranged for detecting ionizing radiation, said detector comprising a fluorescent material as described in the present invention, the detector being preferably an X-ray detector, CT-detector or Electronic Portal Imaging detector.

The fluorescent material and/or the detector according to the present invention can be used for example in
a scintillator or fluorescent member for detecting ionizing radiation, preferably x-rays, gamma rays and electron beams; and/or
an apparatus or device used in the medical field, preferably for computed tomography (CT).

Most preferably at least one fluorescent material according to the present invention can be used for a detector or apparatus adapted for medical imaging.

However, the fluorescent material can be used for any detector known in the medical field. Such detectors are for example X-ray detectors, CT-detectors, Electronic Portal Imaging detectors, and the like.

The aforementioned components, as well as the claimed components and the components to be used in accordance with the invention in the described embodiments, are not subject to any special exceptions with respect to their size, shape, material selection and technical concept, so that the selection criteria known in the pertinent field can be applied without limitations.

BRIEF DESCRIPTION OF THE DRAWINGS

Additional details, characteristics and advantages of the object of the invention are disclosed in the sub-claims, the Figures and the following description of the respective Figures and examples, which—in an exemplary fashion—show preferred embodiments according to the invention.

FIG. 1 shows two spectra of two different examples according to the present invention.

EXAMPLE I

In the Example, a $Gd_2O_2S$:Nd pigment powder with a Nd concentration of 0.1 wt. % was used. 3 kg of said pigment powder were admixed with 0.0055 g of LiF as sintering and/or flux aid.

First, the temperature was raised by approximately 20K/min until 800° C. was reached, upon which a dwelling step was performed for 25 min. During part of the dwelling step, the pressure was raised by 2.5 MPa/min until approximately 50 MPa was reached.

Subsequently, the temperature was again raised by 10K/min to 1050° C., followed by a simultaneous increase in temperature of 2K/min and in pressure of 1 MPa/min until the maximum pressure of 150 MPa and the maximum temperature of 1250° C. was reached.

At this point, hot-pressing was performed for 240 min.

After the pressing was finished, first the pressure was reduced by 5 MPa/min and then the temperature by 3 K/min until ambient temperature and pressure values were reached.

EXAMPLE II

A second $Gd_2O_2S$:Nd ceramic with a Nd content of 2 wt. % was made in the same way as in Example I.

FIG. 1 shows the emission spectra of the material of Example I (solid line) and Example II (dotted line), wherein X-radiation at 230 nm was used as incident light. It can be seen quite well that Nd as an activator fulfils the criteria for successful use in CT and X-ray applications.

The particular combinations of elements and features in the above-detailed embodiments are exemplary only; the interchanging and substitution of these teachings with other teachings in this patent and in the patents/applications incorporated herein by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not to be interpreted in a limiting sense. The invention's scope is defined in the following claims and equivalents thereto. Furthermore, reference signs used in the description and claims do not limit the scope of the invention as claimed.

The invention claimed is:

1. A detector arranged for detecting ionizing radiation, said detector comprising a $Lu_3Ga_5O_{12}$:Nd fluorescent material, wherein the $Nd^{3+}$ concentration is between $\geq 10$ and $\leq 2000$ wt. ppm, wherein the detector is an X-ray detector, CT-detector or Electronic Portal Imaging detector.

2. The detector according to claim 1, wherein the $Lu_3Ga_5O_{12}$:Nd fluorescent material is a ceramic material.

3. The detector according to claim 1, wherein the $Lu_3Ga_5O_{12}$:Nd fluorescent material includes: at least one of a Pr, Dy, Sm, Ce, Eu, or Yb contaminate, wherein a concentration of the at least one of the Pr, Dy, Sm, Ce, Eu, or Yb is less than 0.5 mole ppm.

4. A method, comprising:
   detecting ionizing radiation with a detector including a fluorescent material, wherein the a fluorescent material includes one of a $Lu_3Ga_5O_{12}$:Nd fluorescent material, wherein the $Nd^{3+}$ concentration is between $\geq 10$ and $\leq 2000$ wt. ppm.

5. The method of claim 4, wherein the fluorescent material is a ceramic material.

6. The method of claim 4, wherein the detector is an X-ray detector, CT-detector or Electronic Portal Imaging detector.

7. The method of claim 4, wherein the detector is part of a medical imaging system.

* * * * *